(12) United States Patent
Smith et al.

(10) Patent No.: US 9,075,619 B2
(45) Date of Patent: Jul. 7, 2015

(54) METHOD AND APPARATUS FOR SUPPORTING MULTI-MODAL DIALOG APPLICATIONS

(71) Applicant: Nuance Communications, Inc., Burlington, MA (US)

(72) Inventors: Kenneth W. D. Smith, London (GB); Solomon Z. Lerner, Sharon, MA (US); Gerard Nantel, Deux-Montagnes (CA); Caroline Drouin, New York, NY (US)

(73) Assignee: Nuance Corporation, Inc., Burlington, MA (US)

( * ) Notice: Subject to any disclaimer, the term of this patent is extended or adjusted under 35 U.S.C. 154(b) by 202 days.

(21) Appl. No.: 13/742,061

(22) Filed: Jan. 15, 2013

(65) Prior Publication Data
US 2014/0201729 A1 Jul. 17, 2014

(51) Int. Cl.

| | | |
|---|---|---|
| G05B 15/00 | (2006.01) | |
| G06F 17/27 | (2006.01) | |
| G10L 15/00 | (2013.01) | |
| G01L 13/00 | (2006.01) | |
| G01L 21/00 | (2006.01) | |
| G06Q 10/00 | (2012.01) | |
| G06Q 40/00 | (2012.01) | |
| G06F 17/00 | (2006.01) | |
| G06F 17/30 | (2006.01) | |
| G06F 15/16 | (2006.01) | |
| G06F 11/30 | (2006.01) | |
| G06F 9/44 | (2006.01) | |

(52) U.S. Cl.
CPC ........................................ *G06F 8/38* (2013.01)

(58) Field of Classification Search
CPC .............. G06F 17/3028; G06F 17/211; G06F 17/2235; G06F 3/048482; G06F 3/04845; G06F 3/1205; G06F 3/1242; G06F 11/2082
See application file for complete search history.

(56) References Cited

U.S. PATENT DOCUMENTS

| | | | | |
|---|---|---|---|---|
| 6,510,411 | B1* | 1/2003 | Norton et al. | 704/275 |
| 6,721,713 | B1* | 4/2004 | Guheen et al. | 715/203 |
| 7,581,170 | B2* | 8/2009 | Baumgartner et al. | 715/234 |
| 7,730,482 | B2* | 6/2010 | Illowsky et al. | 717/177 |
| 8,311,863 | B1* | 11/2012 | Kemp | 705/7.11 |
| 8,595,642 | B1* | 11/2013 | Lagassey | 715/804 |
| 8,775,967 | B2* | 7/2014 | Nixon et al. | 715/795 |
| 2001/0049688 | A1* | 12/2001 | Fratkina et al. | 707/104.1 |
| 2002/0066073 | A1* | 5/2002 | Lienhard et al. | 717/105 |
| 2002/0184610 | A1* | 12/2002 | Chong et al. | 717/109 |
| 2003/0004746 | A1* | 1/2003 | Kheirolomoom et al. | 705/1 |
| 2004/0254904 | A1* | 12/2004 | Nelken et al. | 706/50 |
| 2005/0010892 | A1* | 1/2005 | McNair et al. | 717/101 |

(Continued)

*Primary Examiner* — Don Wong
*Assistant Examiner* — Anibal Rivera
(74) *Attorney, Agent, or Firm* — Hamilton, Brook, Smith & Reynolds, P.C.

(57) ABSTRACT

An embodiment of the present invention includes a method for creating a dialog system that provides a framework for creating a multi-modal dialog application and includes a runtime application package (RAP) enabling runtime media grammars, prompts, classifiers, and so forth, to be separate from a multi-modal dialog application that utilizes the RAP. Embodiments disclosed herein enable newly trained runtime media supporting the multi-modal dialog application to be deployed with ease, and to do so while a dialog service is in operation. Embodiments disclosed herein enable the multi-modal dialog application to be created, deployed, and maintained in an easy and flexible manner, saving an end-user that may be providing the multi-modal dialog application to customers both time and cost.

20 Claims, 8 Drawing Sheets

(56) References Cited

U.S. PATENT DOCUMENTS

| | | |
|---|---|---|
| 2005/0055321 A1* | 3/2005 | Fratkina et al. .................. 706/45 |
| 2006/0155546 A1* | 7/2006 | Gupta et al. .................... 704/275 |
| 2006/0184878 A1* | 8/2006 | Argo et al. ..................... 715/700 |
| 2006/0230410 A1* | 10/2006 | Kurganov et al. ............. 719/311 |
| 2006/0236254 A1* | 10/2006 | Mateescu et al. .............. 715/762 |
| 2007/0150081 A1* | 6/2007 | Nixon et al. ..................... 700/83 |
| 2007/0261027 A1* | 11/2007 | Dhanakshirur et al. ....... 717/113 |
| 2008/0034354 A1* | 2/2008 | Brughton et al. .............. 717/139 |
| 2008/0208876 A1* | 8/2008 | Stoner ............................ 707/100 |
| 2008/0249775 A1* | 10/2008 | Chiu et al. ..................... 704/257 |
| 2008/0301745 A1* | 12/2008 | Liu et al. ........................ 725/110 |
| 2009/0228264 A1* | 9/2009 | Williams et al. ................... 704/9 |
| 2010/0131922 A1* | 5/2010 | Shenfield et al. .............. 717/107 |
| 2010/0251143 A1* | 9/2010 | Thomas et al. ................ 715/760 |
| 2011/0010367 A1* | 1/2011 | Jockish et al. ................. 707/733 |
| 2011/0270613 A1* | 11/2011 | Da Palma et al. ............. 704/260 |
| 2012/0260102 A1* | 10/2012 | Zaks et al. ...................... 713/189 |
| 2012/0303614 A1* | 11/2012 | Mercuri et al. ................ 707/723 |
| 2012/0323606 A1* | 12/2012 | Ananthasubramaniam et al. .................................. 705/3 |
| 2013/0185196 A1* | 7/2013 | Kadur et al. ..................... 705/39 |
| 2013/0238758 A1* | 9/2013 | Lee et al. ........................ 709/218 |

* cited by examiner

METHOD AND APPARATUS FOR SUPPORTING MULTI-MODAL DIALOG APPLICATIONS

BACKGROUND OF THE INVENTION

A Web application may include HyperText Markup Language (HTML) pages, JavaServer Pages (JSPs), servlets, resources, source files, etc. A Web archive (WAR) file is a packaged Web application that may be used to deploy a Web application into a Web server.

SUMMARY OF THE INVENTION

A method, corresponding system, apparatus, and non-transient computer-readable medium employed in conjunction with a dialog system are disclosed herein. An example embodiment includes a method for creating a dialog system that may comprise providing a framework for creating a multi-modal dialog application configurable to perform pipeline operations on dialog during a runtime mode in a server. The example embodiment may comprise including runtime media contained within a Runtime Application Package (RAP) and files of properties associated with the runtime media in the framework. The properties may include runtime and non-runtime properties for the runtime media. The RAP may support the multi-modal dialog application created. The example embodiment may further comprise enabling customization of the RAP in the server accessible by a client via a computer network by enabling modification of the runtime media and the runtime and non-runtime properties of the runtime media via the computer network. The example embodiment may still further comprise enabling activation of the RAP customized to specialize support of the multi-modal dialog application created.

The properties may include tiers of properties. For example, a first set of properties may configure a web service. A second set of properties may override the first set, optionally, in part, as well as act as the default to influence runtime behavior and ancillary (non-runtime) services. Properties contained within the RAP may override the tiers, affecting both runtime and off-line ancillary service behavior.

The runtime properties may effect pipeline operations related to processing user input and providing a response to the user input, and the multi-modal dialog application created may be a frequently-asked-questions (FAQ) multi-modal dialog application.

According to one aspect, runtime properties may target the framework itself. For example, runtime properties may control the suspension and resumption of client sessions such as an FAQ session.

The runtime properties may include properties that effect a behavior of the framework surrounding the pipeline operations.

The non-runtime properties may include properties related to inventory management, classifier training, and other ancillary services.

The runtime media may include grammars, prompts, and classifiers configured to support the multi-modal dialog application created.

The runtime media may include a re-write rules file, filter grammar, disambiguation grammar, stop-words, and training files. A re-write rules file may define abbreviations, acronyms, synonyms, and other short-cuts that might be used in a dialog exchange. Filter grammar may detect out-of-vocabulary text that a FAQ classifier may not be able to handle. Disambiguation grammar may extend grammars to parse customer responses to disambiguation prompts. A stop-words file may define extraneous words that appear in customer queries. Training files may contain anticipated questions and answers for the dialog application.

Enabling activation of the RAP customized may include enabling deploying the RAP customized to the server and controlling via the non-runtime properties whether or not the RAP customized is put into service concurrent with its deployment.

A mechanism to upload and deploy a RAP may employ a representational state transfer (REST) compliant protocol (e.g., RESTful protocol) to the ancillary services. For example, an update service may be provided on the server that may be configured to support a RESTful protocol. The update service may be configured to add or remove RAPs from the inventory and promote a specified RAP into service based on requests communicated via the RESTful protocol. By promoting the specified RAP into service the update service may effectively take a then-active RAP out of service.

Deploying the RAP customized may include uploading the RAP customized to the server wherein uploading does not affect operation of the multi-modal dialog application created if the multi-modal application created is in service.

Enabling customization of the RAP may include enabling an update to or an overwrite of the runtime media and the files of properties while the RAP and the multi-modal dialog application created are in service.

The example embodiment may further comprise enabling an activated RAP to be later reverted via the non-runtime properties to another version of the RAP while the multi-modal dialog application created is in service.

A RESTful protocol may be used to communicate with ancillary services that manage the inventory.

Activating the RAP customized may include enabling the RAP customized to be put into service temporarily without affecting a behavior of an in service multi-modal application.

Enabling customization of the RAP may include enabling copying, pasting, editing, and saving the RAP as a new version of the RAP.

The example embodiment may further comprise enabling utilization of the RAP customized by multiple service instances of the multi-modal dialog application created wherein the multi-modal dialog application is a web service application on the server.

The server may be a web server.

The example embodiment may further comprise deploying the RAP customized on one or more web servers connected by a network topology. The one or more web servers may be Tomcat web servers.

Another example embodiment may include a non-transient computer-readable medium having stored thereon a sequence of instructions which, when loaded and executed by a processor, causes the processor to complete methods disclosed herein.

It should be understood that embodiments of the invention can be implemented in the form of a method, apparatus, system, or computer readable medium with program codes embodied thereon.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale.

DETAILED DESCRIPTION OF THE INVENTION

Figure 1A:
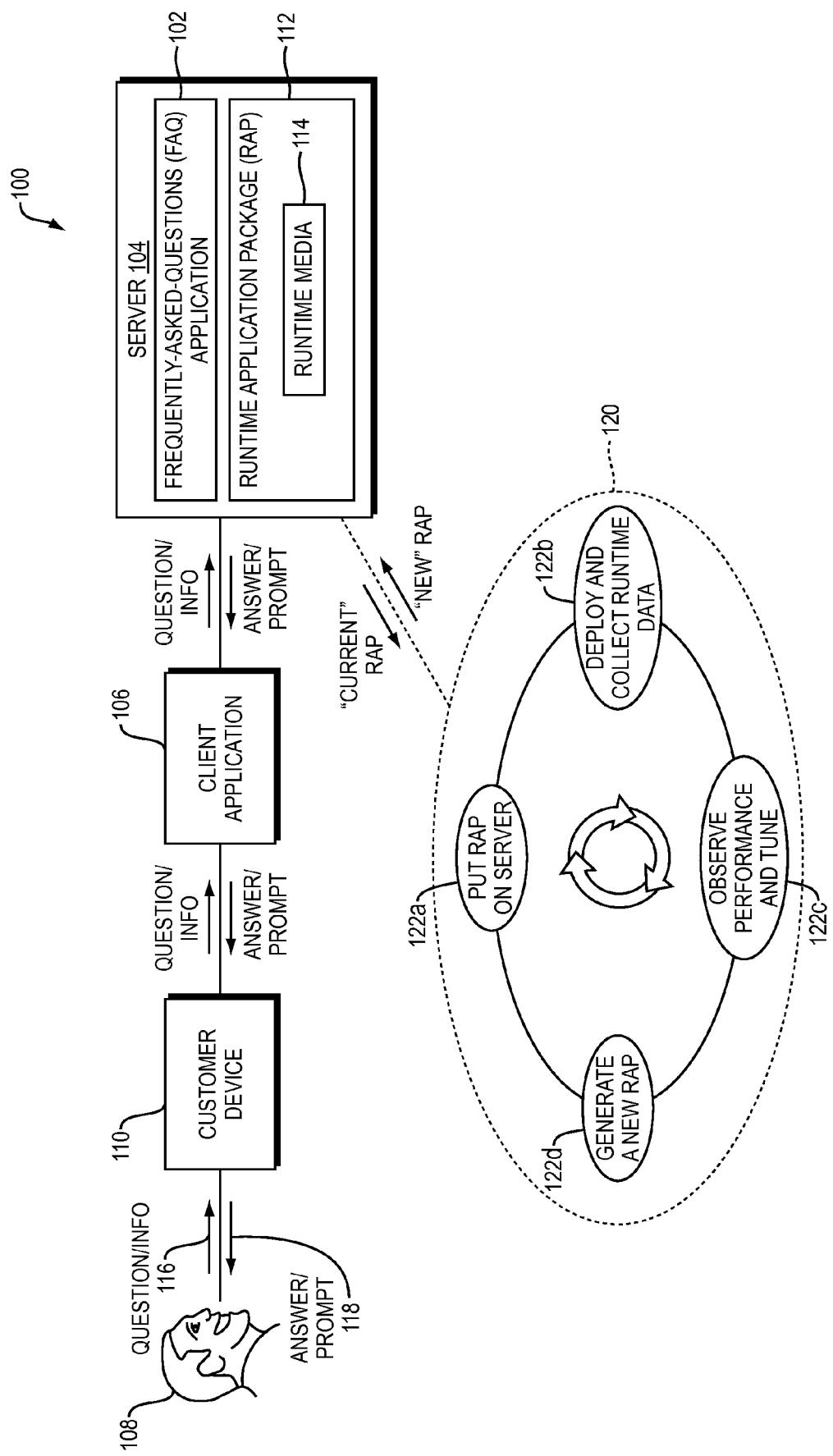
FIG. 1A is a diagram of an embodiment of a dialog system.

A description of example embodiments of the invention follows.

Embodiments disclosed herein separate and deploy media to support applications such as a multi-modal dialog application in a manner that maximizes ease of use for creating, deploying, and maintaining the multi-modal dialog application. A client such as an original equipment manufacturer (OEM) may provide the multi-modal dialog application to customers interacting with the multi-modal dialog application. Over time, the client may need to update and maintain the multi-modal dialog application based on observed performance of the interactions of customers with the multi-modal dialog application.

Media, such as applications runtime media, including grammars, prompts, classifiers and so forth, have historically been treated as distinct resources with limited effort invested in making the maintenance, update or deployment of these easy on the client. Enterprise solutions have traditionally been hard for clients to deploy and maintain. Traditionally, neither the product nor the sample application leveraging the product, work "out-of-the box," causing clients to invest time and money to climb steep learning curves in order to provide applications to customers.

Embodiments disclosed herein may utilize Web technologies enabling a multi-modal application to be delivered as a generic, language/locale specialized Web Archive (WAR) which includes a default runtime application package (RAP) for the multi-modal application effectively creating a sample application (e.g., bootstrap media). As a WAR is first deployed to a Web server, the bootstrap media may be installed into service taking on a service identity from whichever name is specified at the time the WAR is deployed. In this manner, a multi-modal application may be ready to be run "out-of-the-box" with an identity chosen by the client. A framework including a Web server and other ancillary tools may be installed by a client. The client may deploy an application WAR to the Web Server through traditional (e.g., familiar) Web procedures. The client is immediately able to use the dialog system, which utilizes an expanded version of the sample application on startup.

Embodiments disclosed herein relate to packaging runtime media separate from an advanced natural language understanding (NLU) application that uses it, and a framework for enabling same. A package including the runtime media is called a runtime application package (RAP). The RAP may include prompt bundles, grammars, classifiers, unstructured information management architecture (UIMA) descriptors, etc. A RAP may include runtime and training parameter settings and overrides. Embodiments disclosed herein enable training of the media that supports a multi-modal dialog application with the deployment of the media into service while the service is in operation.

A client may customize a RAP by adapting the RAP over time based on performance trends of interactions observed for a customer base using the multi-modal application. For example, if the multi-modal application is a frequently-asked-questions (FAQ) application, the types of questions being asked by customers over time may change and updates to the RAP may improve accuracy for responses provided to the questions. By providing a RAP, creating, specializing, deploying, and maintaining a multi-modal application may be performed with ease. The RAP enables a client to think about and customize the multi-modal application in its entirety as the client may understand each of the components in a single context, the context of the RAP.

FIG. 1A is a diagram of an embodiment of a dialog system 100. In the example embodiment, a client's workflow 120 for continuously improving performance of a multi-modal dialog application 102 may include putting a RAP 112 on the server 104 (122a), deploying the RAP 112 on the server 104 and collecting runtime data (122b), observing the performance of the multi-modal dialog application 102 and tuning runtime media 114 included in the RAP 112 (122c), generating a new RAP that includes the tuned runtime media (122d), and putting the new RAP on the server 104 (122a), and so forth. A client (not shown) may be enabled to perform hot updates of the multi-modal dialog application 102 by simply putting the new RAP generated into service. Clients may perform hot updates by putting the new RAP generated into service.

In the example embodiment of FIG. 1A, the dialog system 100 includes a multi-modal dialog application such as an FAQ application 102 that runs on the server 104. The server 104 may be a web server such as a Tomcat web server, or any other suitable server. It should be understood that the multi-modal dialog application may be any suitable multi-modal dialog application and is not restricted to an FAQ type application included in the example embodiment. In the example embodiment, a server 104 may respond to input 116 from a customer 108. A client application 106 may pass the input 116 to the server 104 and may pass a response 118 from the server 104 back to the customer.

An FAQ application is an NLU application that may classify questions and other information (116) from a customer 108 into one of many categories and effect a response 118 to be provided to the customer 108. The response 118 may include an answer to the customer's question or may include a prompt for more information from the customer 108. For example, if a meaning of the customer's input (e.g., a question provided by the customer via text or speech) is not clear, the FAQ application 102 may prompt the customer 108 for more information in order to narrow the scope of possible responses.

Thus, a customer's interaction with the FAQ application 102 may include a series of questions and responses, interrupted by an occasional prompt to help find the best response in a list of answers maintained within the FAQ application 102. The client (not shown) may provide the FAQ application 102 to users (e.g., customers of the client), such as the customer 108. The FAQ application 102 may accept questions and provide answers relating to products, services, subscriptions, features, versions, procedures, etc. According to embodiments disclosed herein, the client may be enabled to create and maintain a multi-modal dialog application, such as the FAQ application 102, with ease.

The client's FAQ application 102 may be used to provide answers about the client's products, services, subscriptions, features, versions, procedures, etc. to customers. The RAP may include a listing of questions that need to be asked and a mapping between the questions in the list and responses to the questions. For example, text or speech input by the customer 108 may be mapped by a classifier in the RAP 112 by translating to a set of known questions that are mapped to most likely answers. Thus, one or more files may control the dialog.

The classifier 115c may be configured to perform semantic classification to enable an understanding of the meaning and purpose of a customer's question and to return an appropriate answer. In the FAQ application 102, dialog may include a series of questions and responses, interrupted by an occasional prompt to help find the best response in a list of ambiguous answers. For example, if the meaning of the customer's input is not clear, the FAQ application 102 may prompt the customer 108 for more information to narrow the scope of possible responses. Over time, the classifier may be "trained" by the client by using domain-specific data to improve response accuracy.

The RAP 112 may be expanded to interpret a response, providing disambiguating dialog code. For example, the RAP 112 may include content to enable a disambiguation step in a dialog. The RAP 112 may include what is needed in order to implement the FAQ application 102. The RAP 112 may be customized to enable the dialog system to be implemented according to the client's preferences and to adapt an existing dialog system by deploying a RAP that may be identified based on components included in the RAP as being a "new" RAP.

The FAQ application 102 may initially be based on information that may be available through company websites, catalogs, brochures, marketing materials, and technical documentation, etc. Over time, it may be determined that the performance of the FAQ application 102 would be improved by updating the FAQ application 102. For example, the performance of the FAQ application 102 may be improved by adding new information when a tuning analysis reveals unexpected questions, also referred to herein as queries, from customers interacting with the FAQ application 102.

For example, the customer 108 may interact with the FAQ application 102 by providing a question 116 to a customer device 110 (e.g., smart phone) that submits the question via a client's application 106 to the server 104 where the FAQ application 102 is deployed. The server 104 may be a web server and the FAQ application 102 may be run as a web service on the web server. The web service may include the RAP 112 that is deployed on the server 104. The RAP 112 may support the FAQ application 102. The RAP 112 may bundle together all of the components, such as runtime media 114, needed for the client to tailor and configure the FAQ application 102.

Embodiments of methods disclosed herein may enable the dialog system 100 to be specialized by the RAP 112 that is configured to support the multi-modal dialog application, such as the FAQ application 102, on the server 104. For example, the RAP 112 may support a multi-modal dialog application such as the FAQ application 102 on the server 104. The FAQ application 102 may utilize the RAP 112 thereby enabling the dialog exchange with the customer 108 in the dialog system 100. The client may be enabled to create and maintain the dialog system with a core set of files, or runtime media 114, that are included in the RAP 112. The runtime media 114 may include a classifier database of previously-trained questions and answers for the FAQ application 102, and as well as other customization files. The FAQ application 102 may use semantic classification to understand the meaning an purpose of a customer's speech or text, and to return appropriate answers. Over time, a classifier may be trained with domain-specific data for greater accuracy.

Figure 1B:
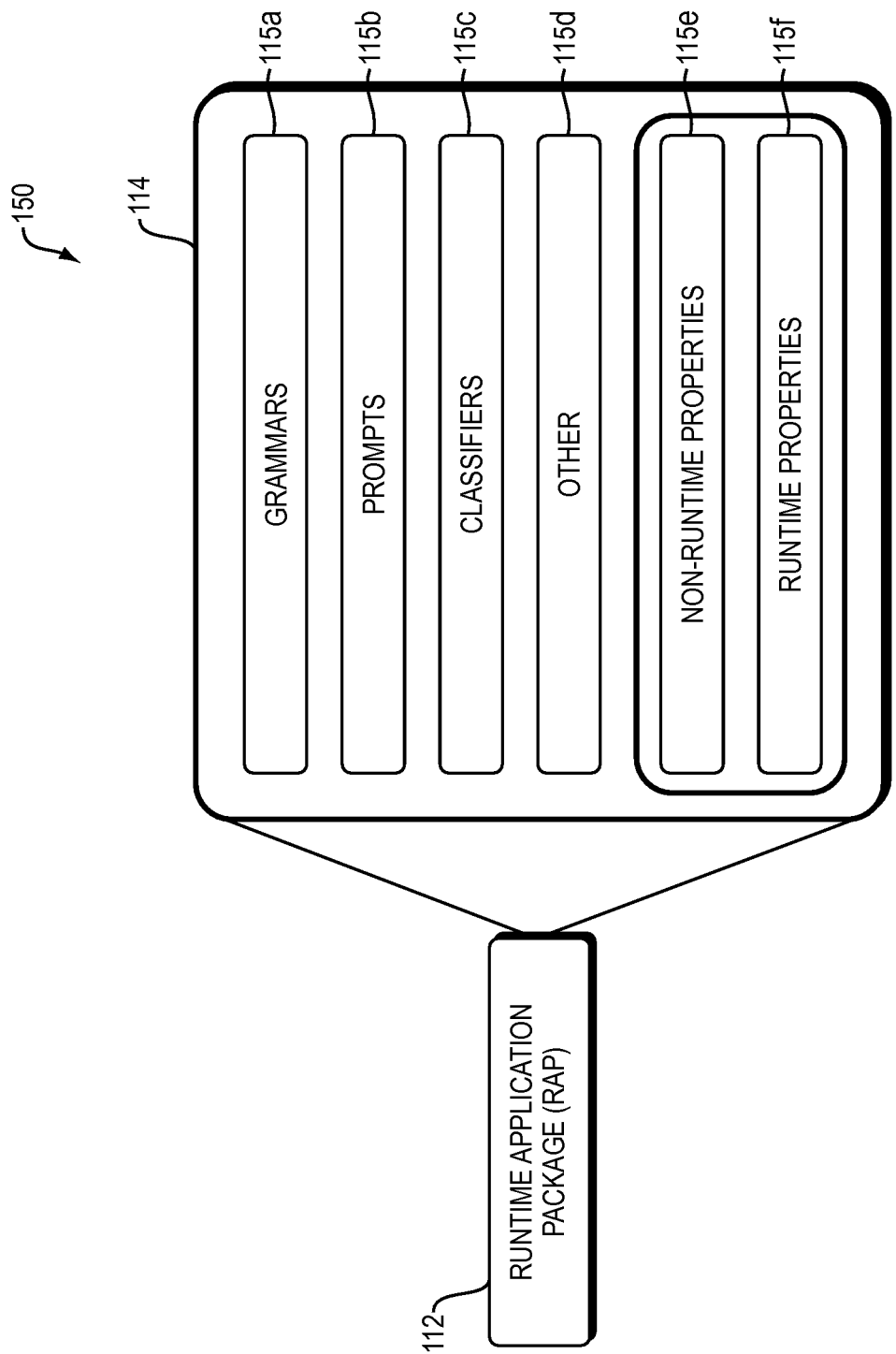
FIG. 1B is a diagram of an embodiment of the components of a Runtime Application Package (RAP).

FIG. 1B is a diagram 150 of an embodiment of the components of the RAP 112. The RAP 112 may include runtime media 114 that includes grammars 115a, prompts 115b, classifiers 115c, non-runtime properties 115e, and runtime properties 115f configured to support the multi-modal dialog application created. The prompts file 115b may define prompts to clarify customer queries. The runtime properties 115f may include properties that effect a behavior of the framework surrounding the pipeline (e.g., NLU pipeline) operations. The runtime properties 115f may effect processing block or a pipeline such as any property that has an effect on the customer's input and effects the providing of a response to the input. The non-runtime properties 115e may include properties related to inventory management, classifier training, and other ancillary services.

The runtime media 114 may include other components 115d, such as a re-write rules file, filter grammar, disambiguation grammar, stop-words, and training files (not shown). A re-write rules file may define abbreviations, acronyms, synonyms, and other short-cuts that might be used in a dialog exchange. Filter grammar may detect out-of-vocabulary text that a FAQ classifier may not be able to handle. Disambiguation grammar may extend grammars to parse customer responses to disambiguation prompts. A stop-words file may define extraneous words that appear in customer queries. Training files may include anticipated questions and answers for the multi-modal dialog application.

Figure 2:
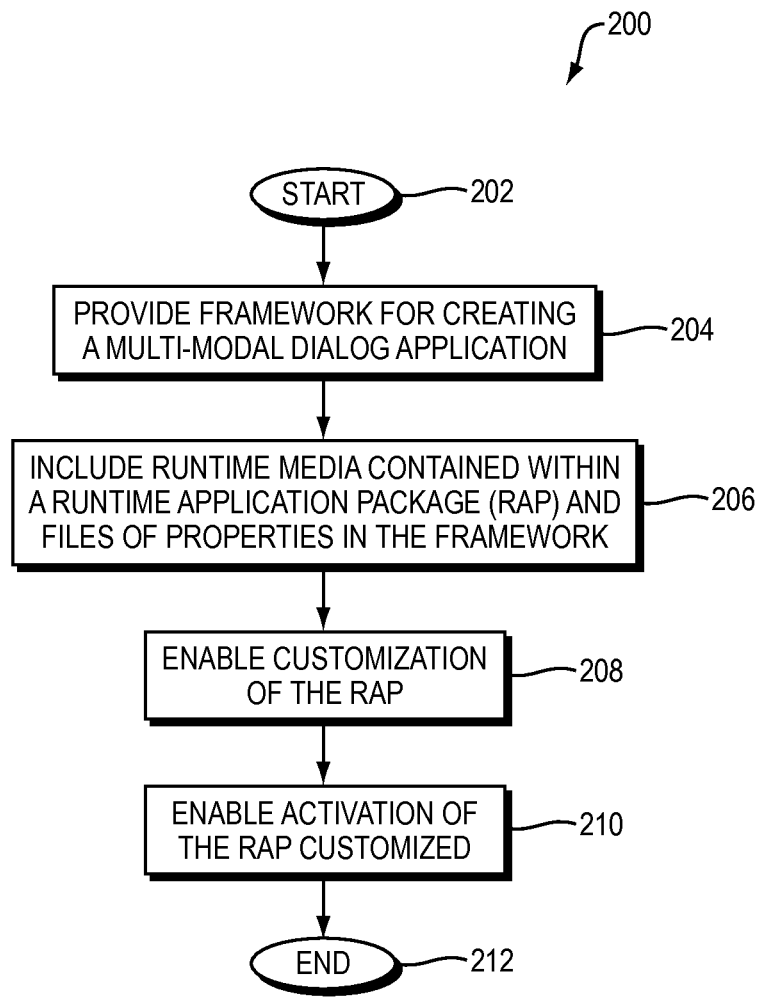
FIG. 2 is a flow diagram of an example embodiment of a method for creating a dialog system.

FIG. 2 is a flow diagram of an example embodiment of a method for creating a dialog system (200). The method may start (202) and provide a framework for creating a multi-modal dialog application configurable to perform pipeline operations on dialog during a runtime mode in a server (204). The method may include runtime media contained within a RAP and files of properties associated with the runtime media in the framework (206). The properties may include runtime and non-runtime properties for the runtime media. The RAP may support the multi-modal dialog application created. The example embodiment may enable customization of the RAP in the server accessible by a client via a computer network by enabling modification of the runtime media and the runtime and non-runtime properties of the runtime media via the computer network (208). The method may enable activation of the RAP customized to specialize support of the multi-modal dialog application created (210) and the method thereafter ends (212) in this example embodiment.

Referring back to FIG. 1A, the RAP 112 includes multiple components such as those included in the runtime media 114 that may be integrated together as one package. The client may edit the RAP 112 in a clear and consistent manner using a skeleton RAP that may be provided as a starting point. The application processing may be controlled via parameters included in the RAP. Application processing may be based on editable properties of the RAP. According embodiments disclosed herein, the multi-modal application may be easily created and deployed by the client by providing the client with a validated installation, including a multi-modal application (e.g., NLU pipeline, servlets, etc.) and a sample RAP that may be used as the "skeleton" in which the client's customized application may be created.

The sample RAP provided may support a few simple questions for a FAQ application. A multi-modal dialog application may interpret the RAP to implement dialog specific to the multi-modal dialog application. Multiple sample RAPs may be provided to support the few simple questions in multiple languages. The sample RAP may be bundled with the multi-modal dialog application, representing a generic usable example of the multi-modal dialog application.

A WAR may be deployed to a web service, and expanded, enabling the sample application to be automatically put into service. The client may be enabled to override the sample application with the client's tailored RAP. The sample RAPs provided may serve as templates for developing a multi-modal dialog application such as the FAQ application for each of the multiple languages. For example, for an FAQ application, the client may edit a list of questions included in the runtime media 114. The client may edit the runtime media 114 of the RAP 112 in a prescribed manner. A client may edit a prompt file that may be implemented in Extensible Markup Language (XML), or in any other suitable manner.

According to embodiments of methods disclosed herein, the client simply pulls the sample RAP from a server, such as the server 104, or any other server, edits a set of one or more core files included in the RAP's runtime media 114 to customize the application, and generates a new RAP that may be pushed into service on the server 104. A framework including the RAP may enable creation, customization, and deployment of the multi-modal application, such as the FAQ application 102, to be performed easily by the client "on-premises." According to one embodiment, a WAR may include a sample multi-modal application, such as an FAQ application. The WAR may enable client to get the application up and running. When deployed, the web service may load a specific application in the form of the RAP. The default RAP may be the sample application included. A client may replace the sample application with a customized RAP.

Figure 3:
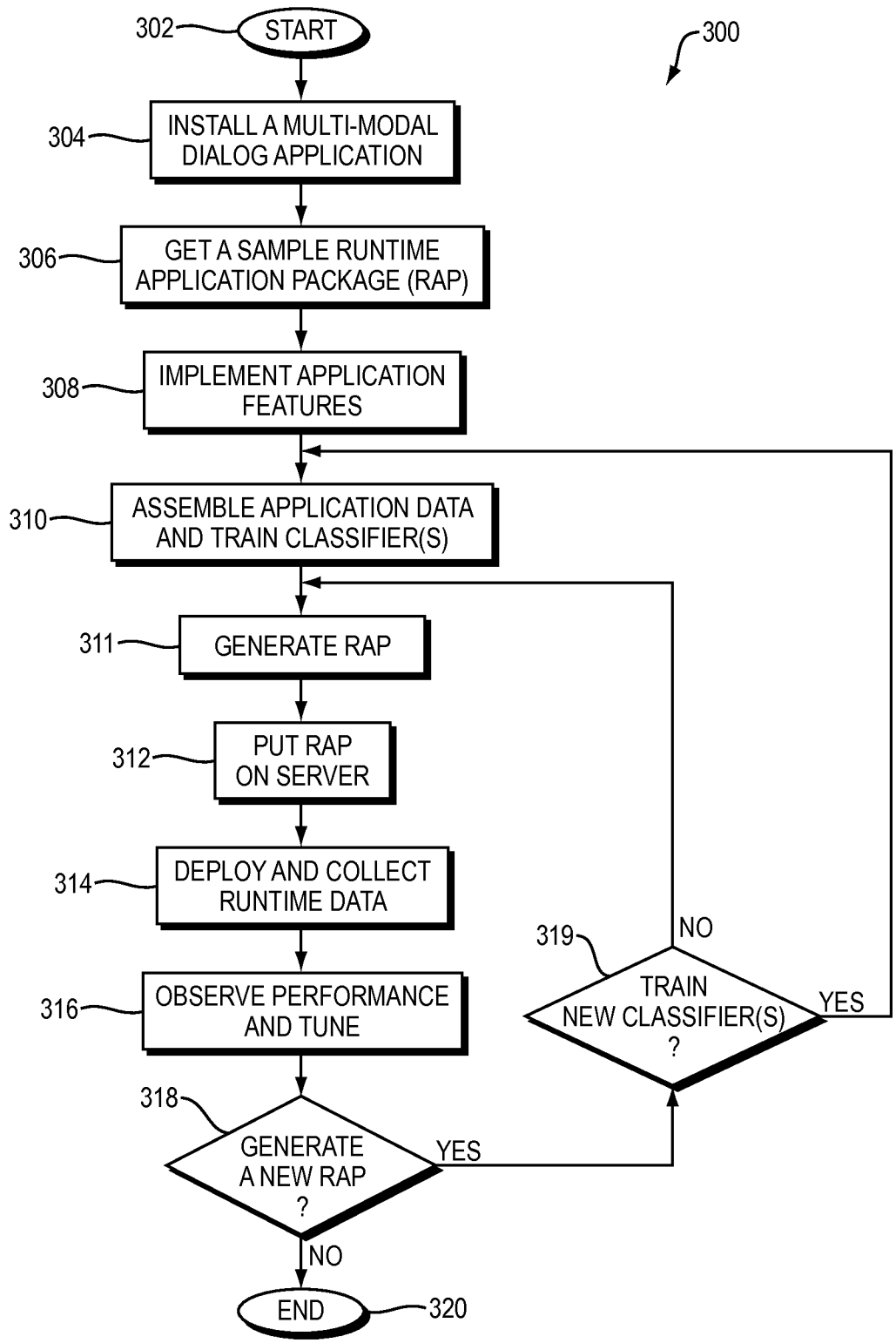
FIG. 3 is a flow diagram of an example embodiment of a method for creating and maintaining a dialog system.

FIG. 3 is a flow diagram of an example embodiment of a method for creating and maintaining a dialog system (300). The method may start (302) and install a multi-modal dialog application. The method may get a sample RAP (306) from a server and customize the RAP by implementing application specific features (308). Application data may be assembled and one or more classifiers included in the RAP may be trained (310). The RAP may be generated (311) and put on a server (312). Once the RAP is deployed, runtime data may be collected (314) and a performance of the multi-modal application may be observed and tuned (316). A decision may be made as to whether or not to generate a new RAP (318). If yes, a decision may be made as to whether or not to train one or more new classifiers (319). For example, training a new classifier may be needed if questions for an FAQ application change, or if runtime properties that affect feature extraction change. If at (319) the decision to train one or more new classifiers is no, the new RAP may be generated (311) and the RAP generated may be put on the server (312), and so on. If the decision to train new classifiers is yes, one or more classifiers included in the RAP may be trained (310), the new RAP may be generated (311), and the new RAP generated may be put on the server (312), and so on. If however, the decision to generate a new RAP at 318 is no, the method thereafter ends (320) in this example embodiment.

Figure 4:
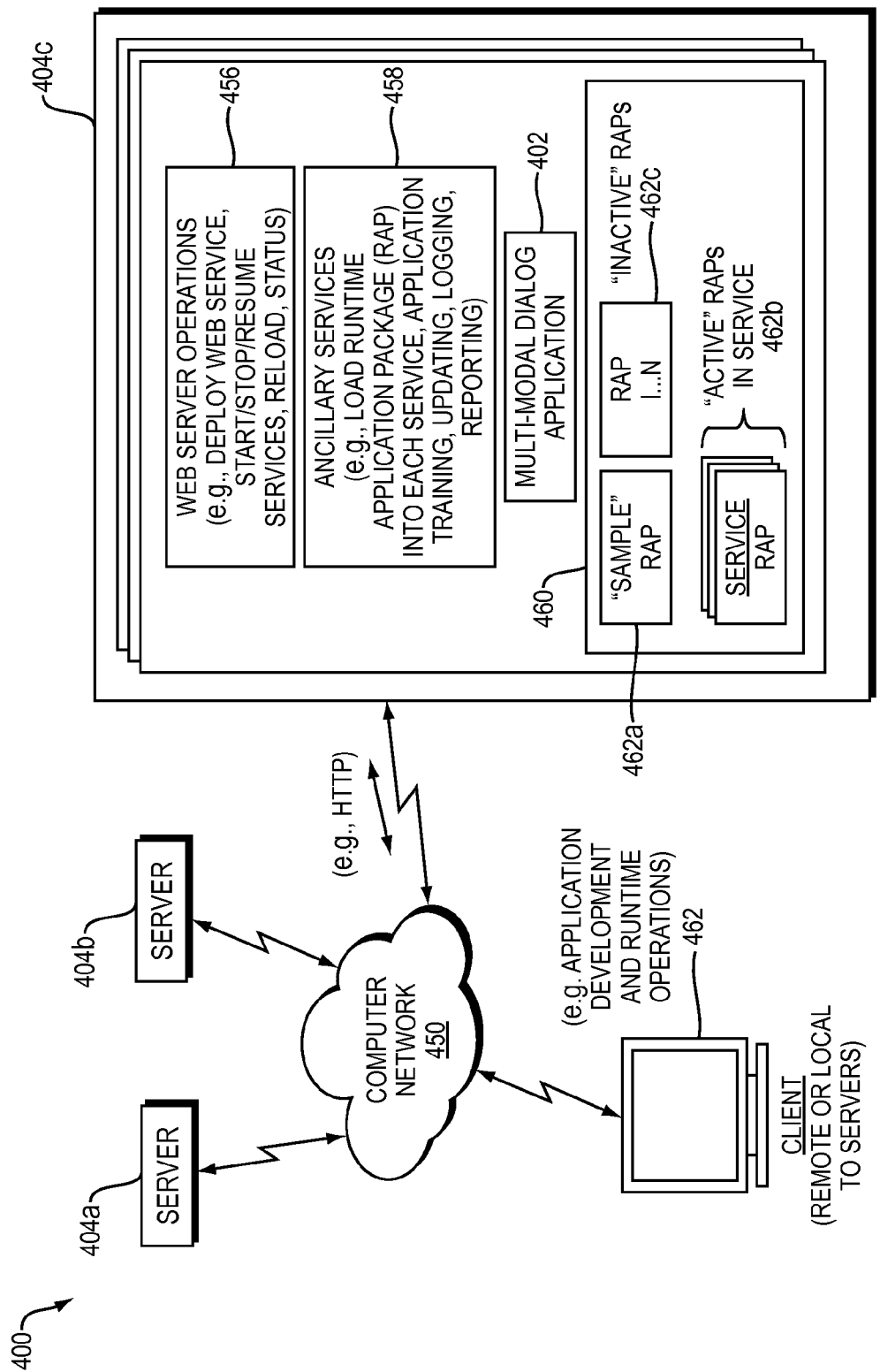
FIG. 4 is a diagram of an embodiment of a system for creating a dialog system.

FIG. 4 is a diagram of an embodiment of a system 400 for creating a dialog system. The system 400 may include one or more servers 404a-404c. The servers 404a-404c may be web servers such as Tomcat web servers, or any other suitable web servers. A client device 462 such as a laptop, desktop, or other suitable computing device, may be communicatively coupled to the one or more servers 404a-404c via a computer network 450. The client device 462 may be at a remote location or local to the one or more servers 404a-404c.

The computer network 450 may be any suitable computer network and may be wired or wireless. The client device 462 may be configured to support an application development system for a client (not shown) and to perform runtime operations on a multi-modal dialog application provided by the client to customers (not shown) that interact with multi-modal dialog application 402 on the server 404c. The client device 462 may communicate with the server 404c using Hypertext Transfer Protocol (HTTP) or any other suitable protocol.

Web server operations 456 may run on the server 404c and may include operations such as deploying a web service, as well as starting, stopping, resuming, and reloading web services. Web server operations 456 may include providing status regarding the web services running on the server 404c. Ancillary services 458 (e.g., servlets) running on the server 404c may handle the upload, download, deletion, putting into service, and training of a RAP as well as aggregating and fetching logs (event logs and trace logs), reports, etc.

The server 404c may include an inventory 460. The inventory 460 may include a "sample" RAP 462a and a set of one or more RAPs 462b and 462c, one or several of which may be active at a time. The web server operations 456 and ancillary services 458 may support protocols that accept HTTP requests from a web browser (not shown) on the client device 462. HTTP or another suitable protocol may be used by the web browser on the client to get or put RAPs on the server 404c. The workflow for a client's multi-modal application development may include downloading a RAP from the inventory 460 and creating a new application by updating the runtime media and generating a new RAP that may be deployed on the server 404c.

The client may download (e.g., get), upload (e.g., put), and deploy a RAP into service using HTTP methods such as GET, PUT, and POST from a web browser (not shown), or any other suitable protocol or methods. The inventory 460 may include a production RAP (e.g., current release), a completed RAP undergoing tests (e.g., targeted for use in a next release), and an in-development RAP (e.g., targeted for use in a future release). Embodiments disclosed herein enabled the client to revert and switch among all RAPs in the inventory.

A WAR may include a sample application such as an FAQ. The WAR may be enough to get the application up and running. The RAP may include all of the components necessary to tailor and configure the application wrapped up in a bundle. The client may train the application by creating training files from a knowledge base. For example, a knowledge base may include information from company websites, catalogs, marketing materials, etc. Embodiments disclosed herein enable new information to be added easily by the client when a tuning analysis reveals unexpected text entered by customers. Embodiments disclosed herein may bundle the training files with an existing application RAP, deploying training media to a server. According to one embodiment, the RAP may be a Java Archive file with a well defined structure. The RAP may be versioned to gauge compatibility with the multi-modal application supported by the RAP. By leveraging a ubiquitous and well recognized format such as a Java Archive file format, the RAP may be assembled by the client via common Java software development kit (SDK) tools. On-premises, the client may be enabled to build an application easily. The user may update the application by editing a prompt properties file, edit or add filter or disambiguation grammars, edit a runtime properties file, re-package the RAP, and deploy the new RAP. According to another embodiment, the RAP may be "signed," enabling corrupted components of the RAP to be identified before any attempt is made to deploy the RAP.

The client device 462 may attach to a log file (not shown) on the server 404c via any suitable protocol. A web service application (not shown) on the server 404c may include multiple service instances (not shown). The web service application may be implemented in any suitable manner such as via Tomcat web server instances that may enable an application to run on one or more web servers that may each instantiate one or more service instances. After training a single RAP, the RAP may be deployed to each service instance and may be replicated by the client on multiple web servers throughout a network topology.

The inventory 460 may support multiple different variations and enable the client to revert and synchronously activate new RAPs by coordinating changes of multiple different files. For example, the files may be encapsulated as a single RAP enabling an update to happen for all files synchronously at the same time. The time may be a predetermined time that is scheduled. Embodiments disclosed herein may enable control of the activation of simultaneous changes, such as different questions in an FAQ application. An inventory label may be assigned to the RAP, enabling specific versions of the various RAP components to be packaged together and deployed into service synchronously. The client may push the RAP to an ancillary service 458 that maintains the inventory of the RAP. A global identifier may be assigned that enabling the client to provide a label so that the RAP may be retrieved and uploaded. The client may query the ancillary service for inventory to determine which RAP is in service.

Embodiments disclosed herein enable the client to create, delete, tag, inventory, revert, and protect (or lock) the RAP. Clients may train new RAPs and validate a RAP by replicating the application supported by the RAP. For example, an in-service RAP may be replicated and a client may need to gauge various RAP responses to FAQs. The replicated RAP may be put into service temporarily to gauge the responses. For test purposes, a service instance may be decoupled from the active client running on the client's device 462. A client may upload a new RAP and run tests or sanity checks to validate the new RAP before coupling the new RAP to the active client running on the client's device 462.

Embodiments disclosed herein may enable a client to validate operation of a deployed RAP by sending queries to the deployed RAP without affecting the operation of the currently active RAP. The client may train the classifier by reconstructing the RAP with a new classifier that more closely matches the behavior desired. A set of configurable application properties may be provided that are cohesive and tie together the runtime media (grammars, prompts, and classifiers). The properties may enable runtime characteristics/behavior and non-runtime auxiliary functions such as training to be easily configured by a client. The runtime and non-runtime properties may both define the application and enable a client to utilize an updated version of the same. A new RAP may be created by a client by editing properties of the RAP. The level to which the RAP is updated and deployed is controlled by the client. For example, one client may select RAP refreshes every two hours while another client may select a refresh every two months.

Embodiments disclosed herein may enable one or several multi-modal dialog applications to make use of a common framework that may include a Web server. In this manner, one or several applications, or several instances of an application, may be deployed in a consistent manner. Since an application may intern itself with a name specified at a time of deployment, more than one application instance may easily be supported on the same Web Server/framework instance enabling validation testing with limited physical resources. A client tailors or customizes an application provided; the customization may be based on specifics of the client's use. For example, a customer may tailor the prompts, grammars, etc. by overriding the media of the sample RAP provided with the application (and available for download from a RESTful ancillary service of the application), or generating a RAP anew. The new RAP may be uploaded and deployed into service with the application.

Embodiments disclosed herein enable the update of runtime media while the service is in operation. Subsequent hot updates may be performed in a manner identical to the procedure for customizing the sample application to begin with, enabling ease of use through familiar, simple, repeated procedures. The output of the ancillary training service is a RAP, ready for use by the client. According to one aspect, if the only update to an existing RAP is the classifier, the ancillary training service may handle the update automatically. For example, a new RAP may be automatically generated that includes the new classifier bundled with elements of the existing RAP.

Embodiments disclosed herein include an inventory method that enables the upload and delayed deployment of new media. Rollback to known good RAPS is supported. According to one embodiment, an inventory method may be offered at a more macro level wherein all Web servers belonging to a cluster may access the RAP. The RAP may be deployed to a distributed and dynamic application topology. Embodiments disclosed herein may enable multiple Web Servers in a cluster on a processing host to share a RAP, facilitating complex processing topologies that include fault tolerance. Furthermore, WARs can be deployed on multiple instances of the underlying framework which have been assigned to distinct CPU or cores to optimize performance.

By including runtime media within a package, a client may be enabled to easily and automatically rollback a RAP if an issue is detected in an attempt to deploy a new package. Similarly, a client may quickly rollback the RAP to an already uploaded and correct package. Testing and validation may be accomplished by simply deploying a same application WAR with a different identity, specialized with an alternate RAP.

A RAP may include runtime properties that may include overrides for both the supporting framework as well as the actual application. By including the properties within the RAP, the properties may be catalogued along with the other media that was current while in service enabling a highly accurate off-line reproduction of in-field performance.

According to one embodiment, several RESTful ancillary services may be included in the framework. Ancillary services 458 may include an update service to upload, download, deploy, list, and delete RAPs and a training service that may take as input a RAP along with additional data files and produces as output a new RAP. The newly generated RAP is immediately ready for use and can be retrieved from the service and later deployed into service with which ever host a client selects. Training and subsequent hot-updates require only four REST operations that are consistent with one another.

Embodiments disclosed herein simplify testing, accurate off-line after-the-fact reproduction of in-field performance, and achieve application verification that resembles a push-to-service process. Embodiments disclosed herein facilitate configuration of local load-balanced clusters and distributed topologies, provide support for runtime parameter changes and enable tracking to the changes, enable rollback to previous application configurations, and achieve process and core affinity support for optimal performance.

Figure 5A:
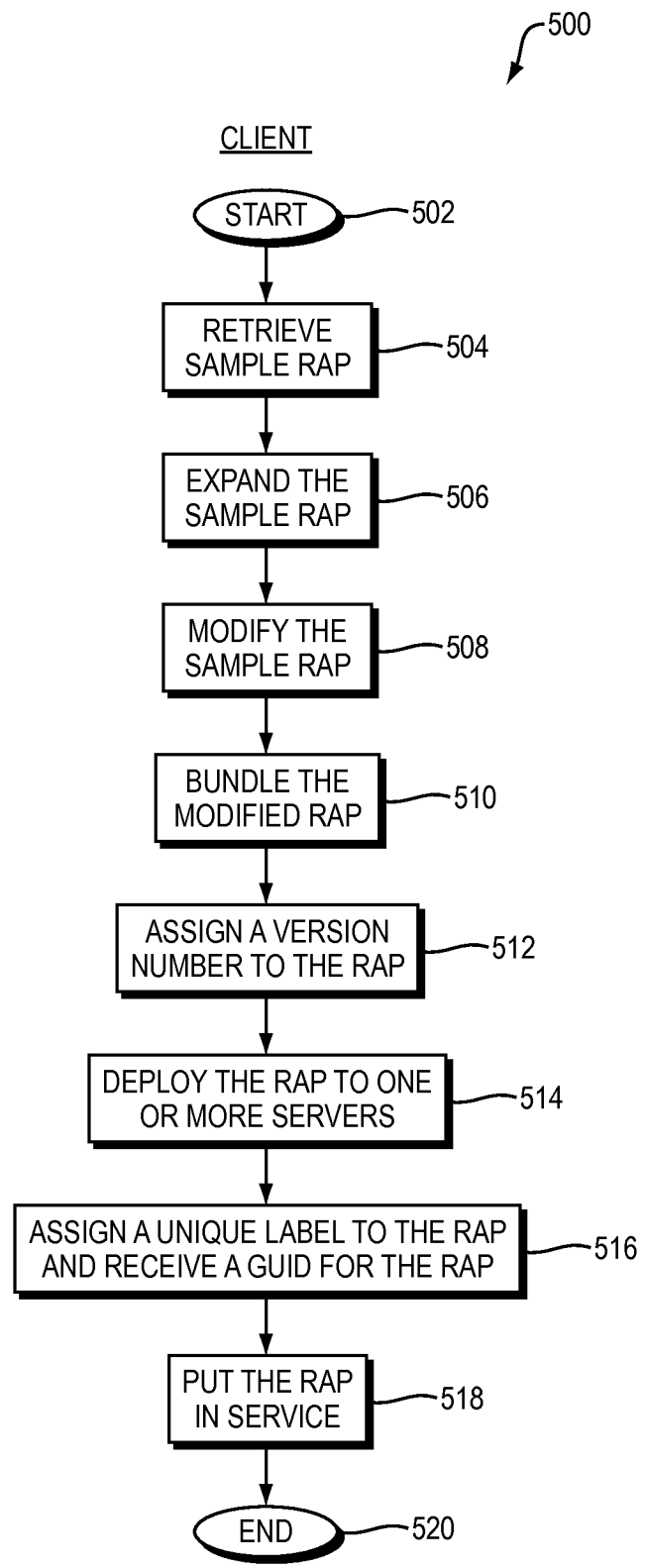
FIG. 5A is a flow diagram of an embodiment of a method on a client device for creating a RAP.

FIG. 5A is a flow diagram of an embodiment of a method on a client device for a creating a RAP (500). The method may start (502) and retrieve a sample RAP (e.g., using HTTP GET) from a server (504). The sample RAP (e.g., a jar file) may be expanded (506) and modified (508). The modified RAP may be bundle, for example, using a jar program utility or another suitable method (510) and a new version number may be added to the RAP (512). The bundled RAP may be deployed (514) to one or more servers (e.g., using HTTP POST), and a unique label may be assigned to the bundled RAP (516) and a globally unique identifier (GUID) may be received (516) from the server. The GUID may be used by the server and the client to identify and perform operations on the RAP. The RAP may be put into service (e.g., using HTTP POST) (518) and the method may thereafter end (520) in this example embodiment. If a new RAP is put into service while a previous version of the RAP is in service, the server may perform a hot insert of the RAP wherein current sessions continue using the previous RAP, and new sessions use the new RAP. The server may remove the previous RAP from memory by detecting that all the RAP's sessions have ended.

Figure 5B:
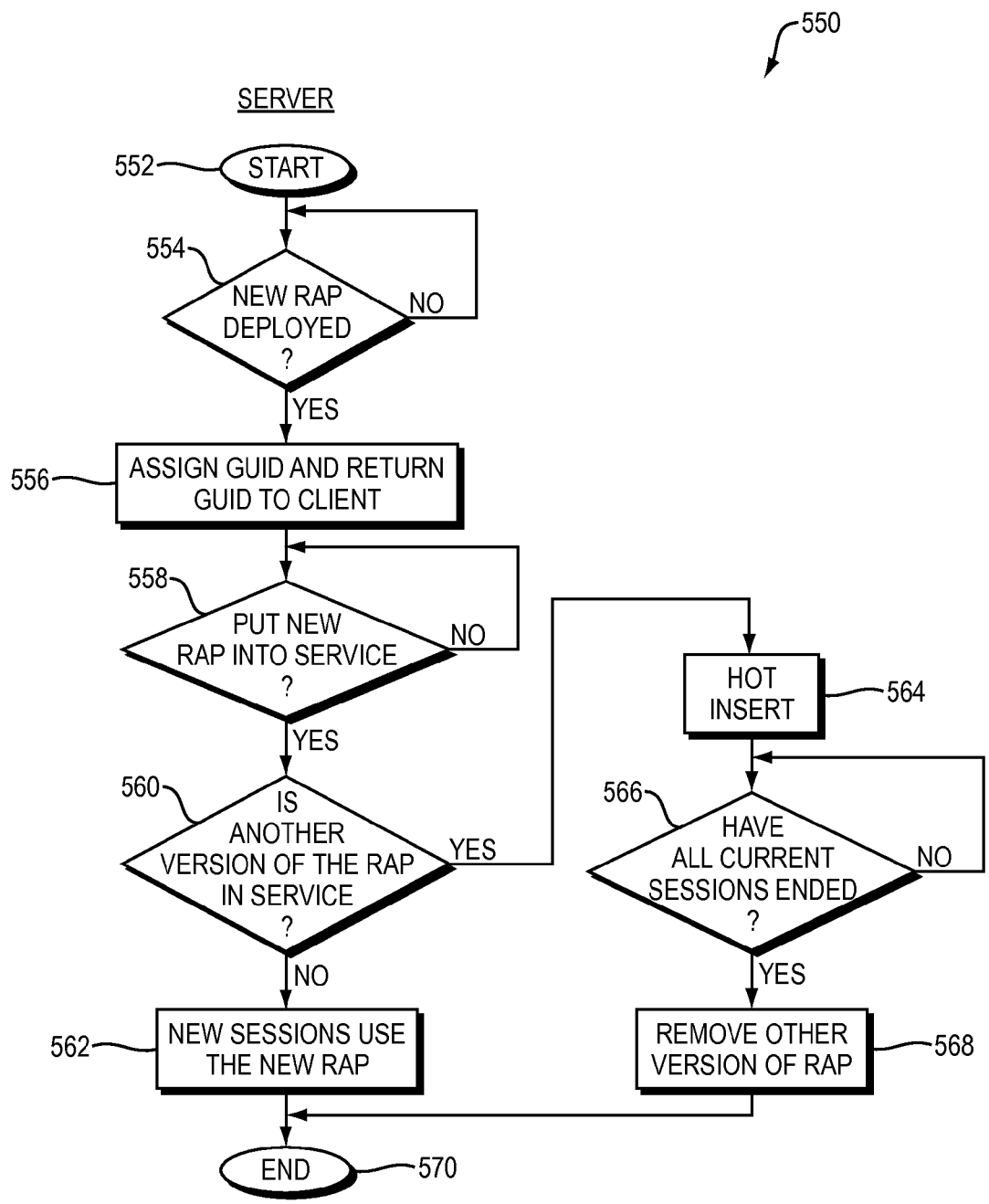
FIG. 5B is a flow diagram of an embodiment of a method on a server for putting a RAP into service.

FIG. 5B is a flow diagram of an embodiment of a method on a server for putting a RAP into service (550). The method may start (552) and check whether or not a new RAP is being deployed by a client (554). If a new RAP is not being deployed the method may continue to check whether or not a new RAP is being deployed by a client (554). If a new RAP is being deployed, the server may generate a GUID and return the GUID to the client (556) and a check may be made to determine whether or not the new RAP is to be put into service (558). If not, the method may continue to check whether or not the new RAP is to be put into service (558). If the new RAP is to be put into service, a check may be made to determine if a another version is in service (560). If a another version of the RAP is not in service, the new RAP may be put into service and new sessions may use the new RAP (562) and the method thereafter ends (580) in this example embodiment. If a another version of the RAP is in service, the server may perform a hot insert of the RAP wherein current sessions continue using the other version of the RAP, and new sessions use the new RAP (564). A check may be made as to whether or not all current sessions have ended (566). If not, the check may continue to be made as to whether or not all current sessions have ended (566). If all current sessions have ended, the server may remove the other version of the RAP from memory (568), and the method thereafter ends (570) in this example embodiment.

Figure 6:
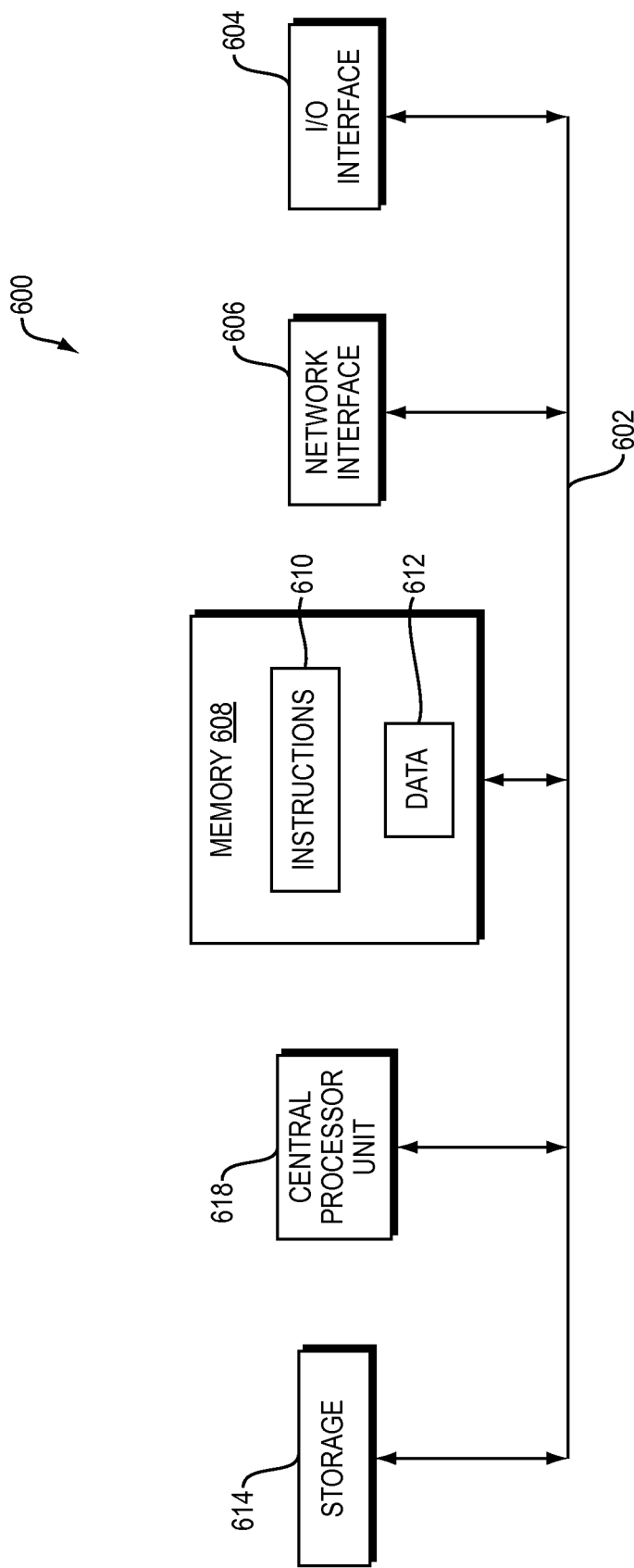
FIG. 6 is a block diagram of an example internal structure of a computer in which various embodiments of the present invention may be implemented.

FIG. 6 is a block diagram of an example internal structure of a computer 600 in which various embodiments of the present invention may be implemented. The computer 600 contains system bus 602, where a bus is a set of hardware lines used for data transfer among the components of a computer or processing system. Bus 602 is essentially a shared conduit that couples different elements of a computer system (e.g., processor, disk storage, memory, input/output ports, network ports, etc.) that enables the transfer of information between the elements. Coupled to system bus 602 is I/O device interface 604 for coupling various input and output devices (e.g., keyboard, mouse, displays, printers, speakers, etc.) to the computer 600. Network interface 606 allows the computer 600 to couple to various other devices attached to a network. Memory 608 provides volatile storage for computer software instructions 610 and data 612 may be used to implement embodiments of the present invention. Disk storage 614 provides non-volatile storage for computer software instructions 610 and data 612 that may be used to implement embodiments of the present invention. Central processor unit 618 is also coupled to system bus 602 and provides for the execution of computer instructions.

Example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer-readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for creating a dialog system, the method comprising:
   providing a framework for creating a multi-modal dialog application configurable to perform pipeline operations on dialog during a runtime mode in a server;
   including runtime media contained within a Runtime Application Package (RAP) and files of properties associated with the runtime media in the framework, the properties including runtime and non-runtime properties for the runtime media, the RAP supporting the multi-modal dialog application created;
   enabling customization of the RAP in the server accessible by a client via a computer network by enabling modification of the runtime media and the runtime and non-runtime properties of the runtime media via the computer network; and
   enabling activation of the RAP customized to specialize support of the multi-modal dialog application created.

2. The method of claim 1 wherein the runtime properties effect pipeline operations related to processing user input and providing a response to the user input, and further wherein the multi-modal dialog application created is a frequently-asked-questions (FAQ) multi-modal dialog application.

3. The method of claim 1 wherein the runtime properties include properties that effect a behavior of the framework surrounding the pipeline operations.

4. The method of claim 1 wherein the non-runtime properties include properties related to inventory management, classifier training, and other ancillary services.

5. The method of claim 1 wherein the runtime media includes grammars, prompts, and classifiers configured to support the multi-modal dialog application created.

6. The method of claim 1 wherein enabling activation of the RAP customized includes enabling deploying the RAP customized to the server and controlling via the non-runtime properties whether or not the RAP customized is put into service concurrent with its deployment.

7. The method of claim 6 wherein deploying the RAP customized includes uploading the RAP customized to the server wherein uploading does not affect operation of the multi-modal dialog application created if the multi-modal application created is in service.

8. The method of claim 1 wherein enabling customization of the RAP includes enabling an update to or an overwrite of the runtime media and the files of properties while the RAP and the multi-modal dialog application created are in service.

9. The method of claim 1 further comprising:
enabling an activated RAP to be later reverted via the non-runtime properties to another version of the RAP while the multi-modal dialog application created is in service.

10. The method of claim 1 further wherein activating the RAP customized includes enabling the RAP customized to be put into service temporarily without affecting a behavior of an in service multi-modal application.

11. The method of claim 1 wherein enabling customization of the RAP includes enabling copying, pasting, editing, and saving the RAP as a new version of the RAP.

12. The method of claim 1 further comprising:
enabling utilization of the RAP customized by multiple service instances of the multi-modal dialog application created wherein the multi-modal dialog application is a web service application on the server.

13. The method of claim 1 wherein the server is a web server, and wherein the method further comprises:
deploying the RAP customized on one or more web servers connected by a network topology.

14. The method of claim 13 wherein the one or more web servers are Tomcat web servers.

15. A non transient non-transitory computer-readable medium having stored thereon a sequence of instructions which, when loaded and executed by a processor, causes the processor to:
provide a framework for creating a multi-modal dialog application in a server;
include runtime media contained within a Runtime Application Package (RAP) supporting the multi-modal dialog application and configurable to perform pipeline operations on dialog during a runtime mode and files of properties associated with the runtime media in the framework, the properties including runtime and non-runtime properties for the runtime media, the RAP supporting the multi-modal dialog application created;
enable customization of the RAP in the server accessible by a client via a computer network by enabling modification of the runtime media and the runtime and non-runtime properties of the runtime media via the computer network; and
enable activation of the RAP customized to specialize support of the multi-modal dialog application created.

16. The non-transitory computer-readable medium of claim 15, wherein the runtime properties effect pipeline operations related to processing user input and providing a response to the user input, and further wherein the multi-modal dialog application created is a frequently-asked-questions (FAQ) multi-modal dialog application.

17. The non-transitory computer-readable medium of claim 15, wherein the runtime properties effect a behavior of the framework surrounding the pipeline operations.

18. The non-transitory computer-readable medium of claim 15, wherein the non-runtime properties include properties related to inventory management, classifier training, and other ancillary services, and further wherein the runtime media includes grammars, prompts, and classifiers configured to support the multi-modal dialog application created.

19. The non-transitory computer-readable medium of claim 15, wherein the sequence of instructions which, when executed by the processor, further causes the processor to enable activation of the RAP customized by enabling deploying the RAP customized to the server and controlling via the non-runtime properties whether or not the RAP customized is put into service concurrent with its deployment.

20. An apparatus for creating a dialog system, the apparatus comprising:
at least one processor; and
at least one memory with computer code instructions stored thereon, the at least one processor and the at least one memory with the computer code instructions being configured to cause the apparatus to perform at least the following:
provide a framework for creating a multi-modal dialog application configurable to perform pipeline operations on dialog during a runtime mode;
include runtime media contained within a Runtime Application Package (RAP) and files of properties associated with the runtime media in the framework, the properties including runtime and non-runtime properties for the runtime media, the RAP supporting the multi-modal dialog application created;
customize the RAP by enabling modification of the runtime media and the runtime and non-runtime properties of the runtime media; and
activate the RAP customized to specialize support of the multi-modal dialog application created.

* * * * *